United States Patent [19]
Gay et al.

[11] Patent Number: 5,282,887
[45] Date of Patent: Feb. 1, 1994

[54] CONDUCTIVE COATING COMPOSITION COMPRISING PIGMENT GRADE CARBON

[75] Inventors: Arthur S. Gay, Palos Park; Salvador R. Lo, Oak Forest, both of Ill.

[73] Assignee: W. C. Richards Company, Blue Island, Ill.

[21] Appl. No.: 901,787

[22] Filed: Jun. 22, 1992

Related U.S. Application Data

[63] Continuation-in-part of Ser. No. 726,902, Jul. 8, 1991, abandoned, which is a continuation-in-part of Ser. No. 607,558, Oct. 31, 1990.

[51] Int. Cl.⁵ .............................................. C09D 5/24
[52] U.S. Cl. .............................. 106/261; 106/266; 106/472; 106/476; 524/63; 524/496; 252/502; 252/510; 252/511; 428/411.1; 428/414; 428/423.1; 428/474.11; 428/480
[58] Field of Search ............. 106/261, 262, 266, 472, 106/476; 524/63, 496; 428/411.1, 414, 423.1, 474.4, 480; 252/502, 510, 511

[56] References Cited

U.S. PATENT DOCUMENTS 3,658,737 4/1972 Irwin .................................. 106/261

Primary Examiner—David Brunsman

[57] ABSTRACT

Conductive coating compositions containing a pigment-grade carbon, a resin and a solvent. The compositions are useful as primers and coatings.

12 Claims, 4 Drawing Sheets

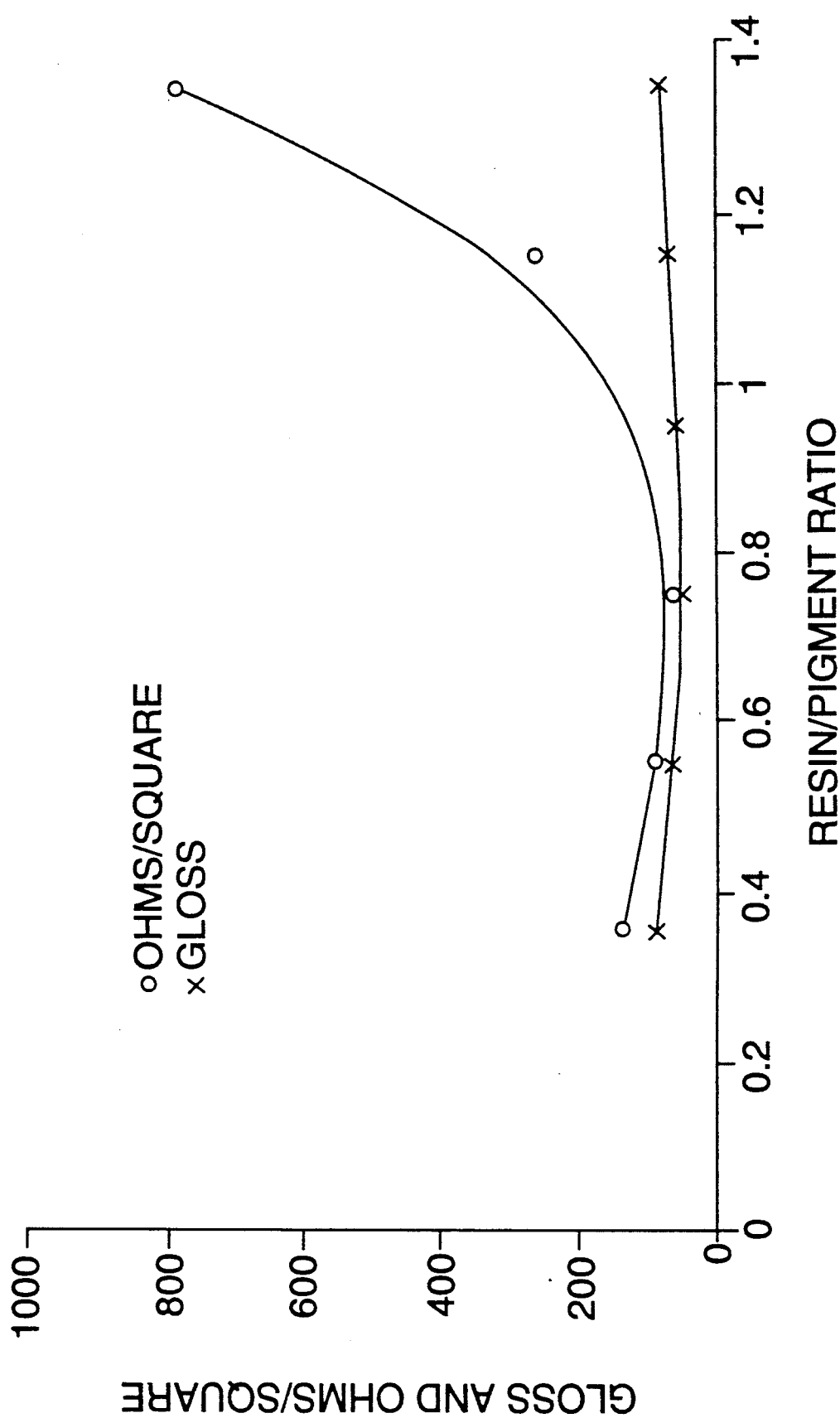

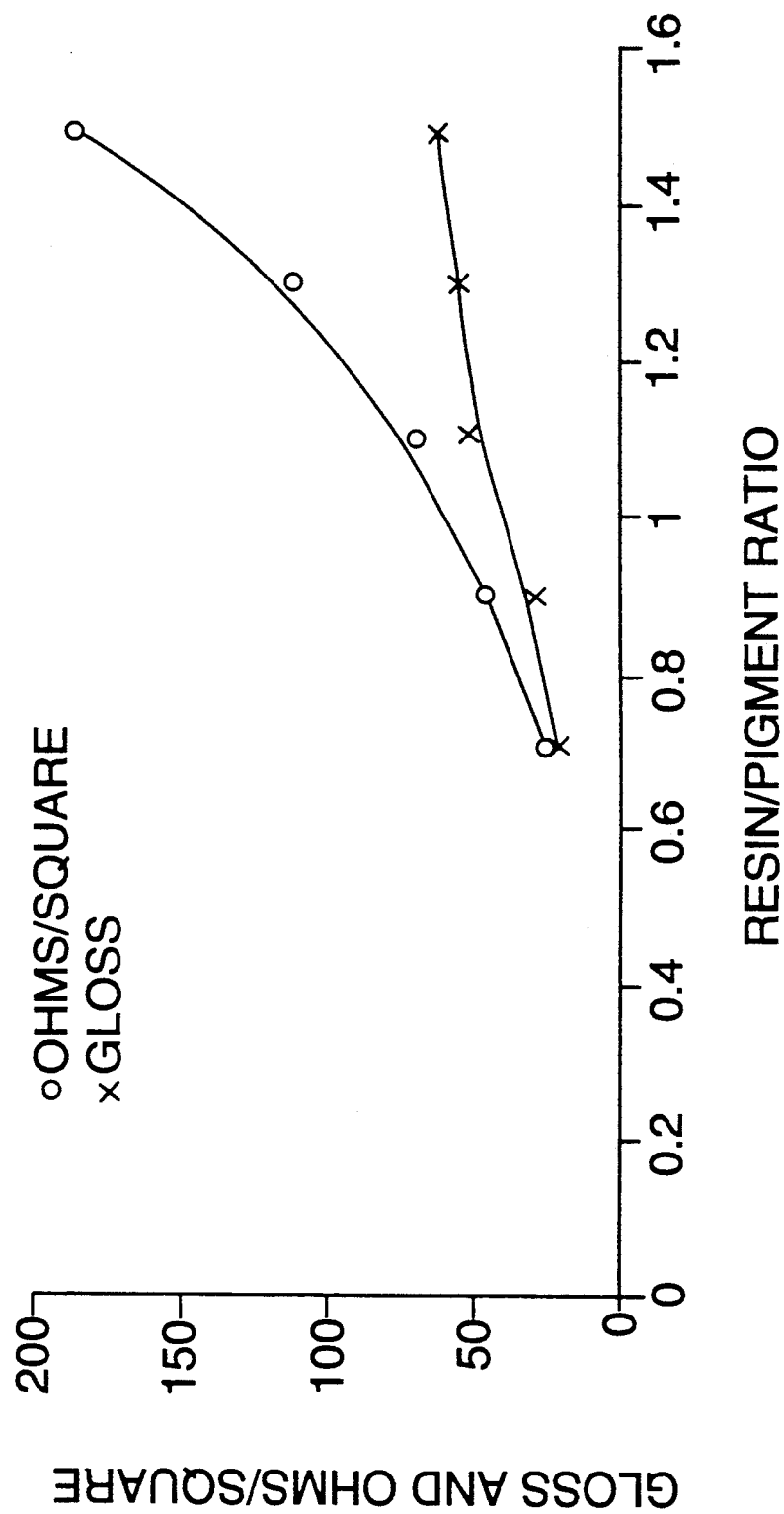

CONDUCTIVE COATING COMPOSITION COMPRISING PIGMENT GRADE CARBON

CROSS-REFERENCES TO RELATED APPLICATION

This application is a continuation-in-part of U.S. Ser. No. 07/726,902 filed Jul. 8, 1991, now abandoned, which in turn is a continuation-in-part of U.S. Ser. No. 07/607,558 filed Oct. 31, 1990.

BACKGROUND OF THE INVENTION

1. Field of the Invention

The present invention relates to conductive compositions which contain pigment grade carbon. More particularly, the invention relates to compositions suitable as primers and coatings in which pigment-grade carbons are utilized as the conductive component.

'726,902. Description of Related

Coating compositions in which conductive carbon is the primary pigment material are well known. For example, U.S. Pat. No. 4,380,596 discloses solvent resistant primer compositions containing elemental carbon such as graphite or lampback. In U.S. Pat. No. 4,504,431, conductive pastes comprising small amounts of conductive carbon and large quantities of masking pigment in a 100% solids system are added to fiberglass and cured to provide electrically conductive articles. Compositions that provide conductive coatings are disclosed in U.S. Pat. Nos. 4,818,437 and 4,818,438; the conductive additive is a ground, calcined, coal-based coke which approaches graphite in performance.

While providing the desired conductivity, these formulations contain high ratios of resin to pigment. High pigment loadings are not used because of the cost of conductive carbons, the inability of such carbon-resin mixtures to form a continuous film free of microcracks and the formation of very viscous compositions when substantial amounts of conductive carbon are included in the formulation. Nevertheless, continuous coatings containing high pigment loadings are desirable in order to provide black coatings in many applications and to reduce the volatile organic compounds (VOC) per gallon of coating to meet the EPA regulations.

Various types of coating compositions using pigment grade carbons are also well known. Thus, U.S. Pat. No. 3,150,110 discloses high gloss aqueous paints containing small amounts of pigment grade carbon while U.S. Pat. No. 3,398,109 teaches solvent type black enamel coatings containing a carbon black which had been subjected to oxidative after-treatment. In U.S. Pat. No. 4,379,871 dispersable color concentrates based on a carbon black pigment powder are disclosed; the concentrates are used to prepare molded parts, castings, films, fibers, etc. However, these coating compositions have not been formulated for use in conductive coating applications.

Electrodepositable compositions containing anthracite and bituminous coals are disclosed in U.S. Pat. No. 3,658,737. These compositions function in the electrodeposition process because the coals do not provide conductive coatings.

SUMMARY OF THE INVENTION

Now it has been found that a conductive coating composition which comprises:
a) a pigment-grade carbon;
b) a resin; and
c) a solvent
wherein the pigment-grade carbon is present in a deagglomerated form provides an economical conductive coating having excellent properties for a variety of uses.

BRIEF DESCRIPTION OF THE DRAWINGS

FIGS. 1-4 are graphs showing resistivity and gloss for coating compositions of this invention a various ratios of resin to pigment.

DETAILED DESCRIPTION OF THE INVENTION

Figure 1:
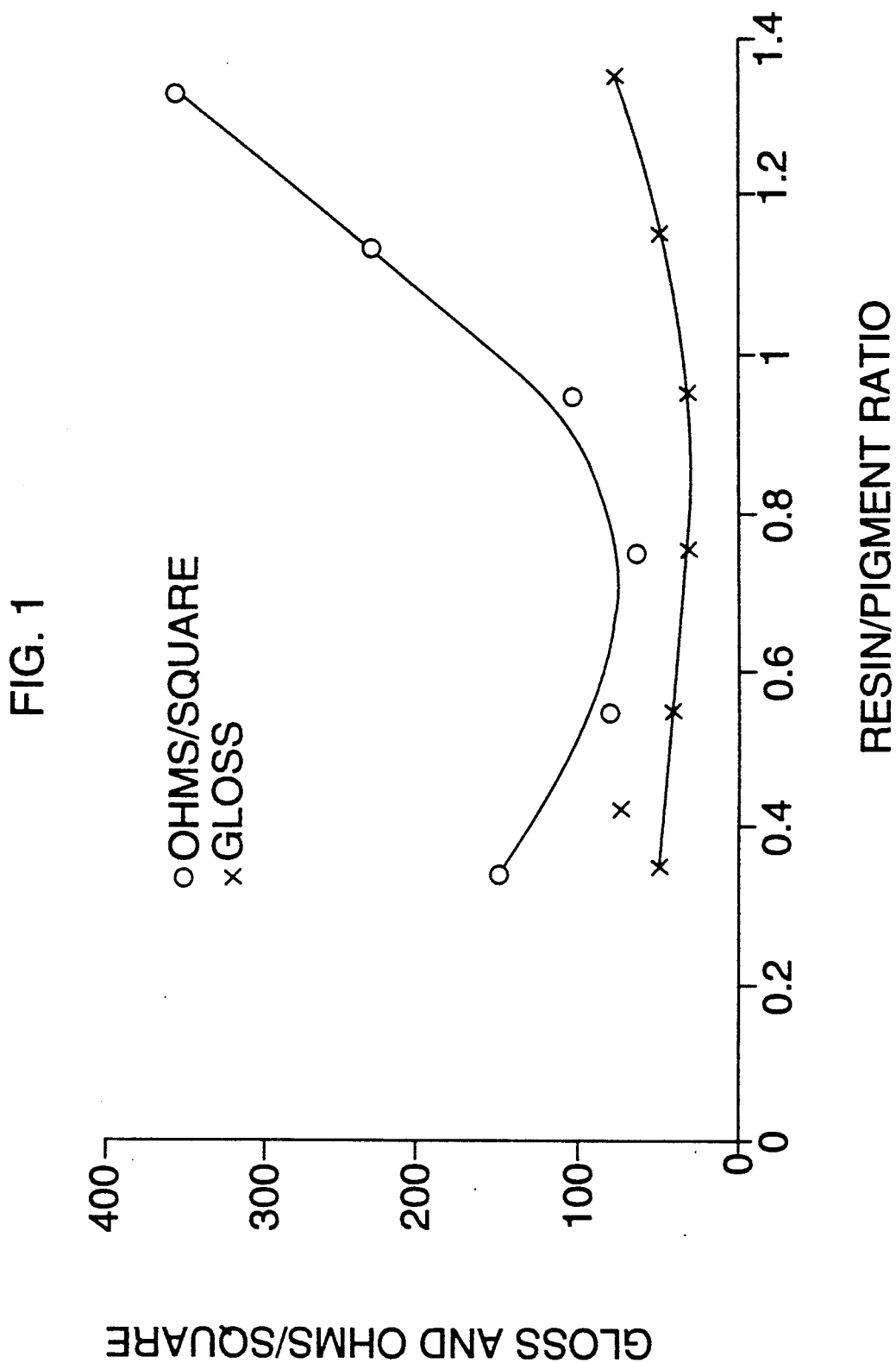

Any pigment-grade carbon can be used in the coating compositions of this invention. Pigment-grade carbons are generally defined as those that are not used for conductive purposes. They are usually lower in oil absorption or vehicle demand than conductive carbons and may have a high tinting power. Generally pigment-grade carbons are used at higher loadings to improve covering power and to fill voids in imperfections on primed surfaces. They are generally not specifically treated to remove impurities and oils or oxidized to give charged surfaces and therefore are significantly less expensive than conductive carbons.

A wide variety of coating resins can be used in the compositions of this invention. Coating resins are lower molecular weight resins that further polymerize and cure upon drying, or higher molecular weight resins that form a continuous coating after evaporation of volatile contents. These resins can be either water-soluble or water-insoluble depending upon the particular vehicle to be used. Thus, polyester, urethane, phenolic, modified phenolic, melamine, epoxy, modified epoxy, acrylic, alkyd, etc. resins can all be employed.

Curing agents are typically used with coating resins, the particular class of curing agent being dependent on the nature of the resin. Suitable curing agents for polyesters include melamine, urea-formaldehyde, urethane, epoxy, etc. With phenolic resins, curing agents such as melamine, urea-formaldehyde, epoxy, etc. can be used. Acrylic resins are generally used with curing agents such as melamine, urea-formaldehyde, epoxy, urethane, etc. Alkyd resins are used in conjunction with metallic driers, melamine, urea-formaldehyde, epoxy, etc.

The resin and pigment are employed at resin to pigment ratios ranging from about 0.35 to 1.5. Nonconductive coatings containing pigment-grade carbons generally contain smaller pigment loadings and substantially higher resin to pigment ratios.

A wide variety of organic solvents can be used with the selection of the solvent dependent upon the resin. Typical solvents for organic soluble resins comprise 1,1,1 trichloroethane, which is also known as methyl chloroform, light aromatic solvent naphtha, etc. However, environmental and safety regulations require a reduction in the VOCs and the use of solvents which do not deplete the ozone layer.

Therefore, desirable solvents that are used are ethers of alkylene glycols such as propylene glycol monopropyl ether, diethylene glycol butyl ether, ethylene glycol butyl ether, diethylene glycol ethyl ether, diethylene glycol methyl ether, ethylene glycol ethyl ether, dipropylene glycol methyl ether, ethylene glycol monopropyl ether, diethylene glycol propyl ether, ethylene glycol monomethyl ether and propylene glycol monomethyl ether. Other suitable solvents include alcohols having two to three carbon atoms such as ethanol and isopropanol Diacetone alcohol, dimethyl acetamide and dimethyl sulfoxide are also suitable.

It is particularly preferred to use the pigment grade carbon in conjunction with the aqueous-based coating compositions comprising water-insoluble resin described in our co-pending application U.S. Ser. No. 07/607,558 filed Oct. 31, 1990, and hereby incorporated by reference herein in its entirety. Such compositions comprise a water insoluble resin, a water-miscible organic solvent and water.

Any water-miscible organic solvent having a Hansen solubility parameter greater than 9.4 and a Hansen hydrogen bonding solubility parameter greater than 4.5, can be used to render the water-insoluble resin water miscible. These solubility parameters are described in Solvents and Diluents Used in Coating Formulations, Eastman Kodak Publication Number M 167 P, November, 1989. When mixed with water, the resulting mixture has a Hansen solubility parameter greater than 12.0 and a Hansen hydrogen bonding solubility parameter greater than 8.4.

In such systems, it is preferred to use one or more of the desirable solvents previously described and water in a sufficient amount so that the ratio by volume of the water to the solvent is at least 0.1. While the ratio can be as high as 2.0, preferably ratios between about 0.2 and 1.0 are employed.

Other ingredients typically used in coating formulations can also be employed. For example, other pigments, inorganics such as calcium carbonate, silica, bayrites and powdered mica, etc. can be used. Leveling agents, flattening agents, adhesion promoters, gloss promoters such as fluorocarbons, water resistant materials such as silicones, can also be employed.

Preferably, compositions of this invention are made by first preparing a base resin formulation by blending resin, curing agent, optional surfactants, non-carbon pigment and solvent. A primer composition is then prepared by adding base resin composition to pigment-grade carbon at the appropriate resin to pigment ratio and grinding to a Hegman grind between 7 and 8, and preferably almost or near to 8, the maximum reading on the Hegman scale.

Compositions of this invention are useful as conductive primers and coatings. They can be applied to hard and soft plastics, non-conductive substrates, metal and plastic combinations, etc.. They can be blended with conductive carbons, other pigments, various co-solvents, etc.

Compositions can be specifically utilized as primer on nonconductive substrates to make the surface of of the nonconductive substrate conductive. The coatings are applied by any conventional means of application as appropriate to the intended use.

Nonconductive substrates coated with these primer formulations having resistivities between about 10 and 5,000 ohms/square exhibit excellent transfer efficiency when topcoated with electrostatic spray coatings. For electrophorectic deposition top coat applications, compositions having a resistivity between about 10 and 200 ohms/square are preferred. Compositions having a resistivity between about 10 and 200 ohms/square are also useful as EMI (electromagnetic interference) coatings and RFI (radio frequency interference) shielding coatings.

The following examples will serve to illustrate the practice of this invention.

EXAMPLE 1

A. Base Resin

A base resin formulation was prepared by blending the following components:

|  | Parts/100 |
| --- | --- |
| Kelsol 3950-BZG-70 (water reducible modified phenolic resin, 70% solids, Reichold Chemical, Durham, N.C.) | 63.0 |
| Cymel 350 (melamine resin curing agent, American Cyanamid, Wayne, N.J.) | 19.5 |
| 5% Manganese Hydrocure (curing and drying agent, Mooney Chemical, Cleveland, Ohio) | 1.4 |
| KR-238-T-Titanate (charged dispersing aid, Kenrich Petrochemicals, Bayonne, N.J.) | 0.5 |
| 50% solution Surfynol 104 (Surfactant, Air Products & Chemicals, Allentown, PA) | 2.5 |
| Dimethyl amino ethanol | 1.0 |
| EKTASOLV EP (ethyleneglycol monopropyl ether, Eastman Chemicals, Kingsport, TN) | 12.0 |

B. Primer

Four primer compositions were prepared at various resin to pigment ratios from the components set forth in Table 1 using the following procedure.

A grindin mill was loaded to 50% of its volume with base resin formulation. The carbon and steel shot were added to the mill and mixture was ground to a Hegeman grind of almost, or near to 8. The Hegman grind is described in ASTM Standard Test Method D 1210-79 (Reapproved 1988). Then the contents of the mill were added to the remaining base resin formulation and thoroughly blended. The pH was adjusted with dimethylaminoethanol to 8-8.5 and viscosity adjusted with dionized water to 30-40 seconds with a Zahn No. 2 cup.

Panels of polyester glass sheet molding compound (Rockwell International) were sprayed using a Binks Spray Gun at 40 psi. The panels were given a two minute flash off and were cured at 250° F. for thirty minutes Resistivity was measured using a Micronta 22-193 manufactured by Radio Shack, Tandy Corp., Fort Worth, Tex.

The results are set forth below.

| COMPOSITION | Parts/100 | Parts/100 | Parts/100 | Parts/100 |
| --- | --- | --- | --- | --- |
| Base Resin Formulation of Part A | 30.6 | 31.7 | 32.7 | 34.8 |
| RAVEN-410 Carbon (Columbian Chemicals, Atlanta, GA) | 30.6 | 28.0 | 25.8 | 21.0 |
| Deionized Water | 38.0 | 39.7 | 40.8 | 43.5 |
| Dimethylaminoethanol | 0.6 | 0.6 | 0.6 | 0.6 |
| R/p Ratio (Resin/Pigment) | 0.63 | 0.72 | 0.8 | 1.05 |
| Ohms/Square | 39 | 33 | 35 | 67 |

The formulation having a R/P ratio of 0.63 was applied to various substrates. Coating thickness and resistivity were determined and are set forth below.

| Substrate | Ohms/Sq. | Thickness (mils) |
|---|---|---|
| Polyester Glass Sheet Molding Compound | 15 | 2.0 |
| Urethane Reaction Injection Molded Plastic | 150 | 2.0 |
| Plywood | 15 | 2.0 |
| Chipboard | 25 | 1.0 |
| Masonite | 20 | 1.5 |
| Paper | 15 | 2.0 |
| Cardboard | 13 | 2.2 |
| Glass | 16 | 2.0 |
| Rubber | 30 | 2.0 |
| Ceramic Tile | 18 | 2.0 |
| PPS (Polyphenylene Sulfide glass reinforced) | 20 | 1.5 |

EXAMPLE 2

Following the procedure and using the base resin formulation of Example 1, a primer composition using a different pigment grade carbon was made and tested; the composition and results are set forth below.

| COMPOSITION | Parts/100 |
|---|---|
| Base Resin Formulation | 34.7 |
| Black Pearls 130 (Cabot Corp., Waltham, Mass.) | 21.3 |
| Deionized Water | 43.3 |
| Dimethyl amino ethanol | 0.63 |
| R/P Ratio | 1.04 |
| Ohms/Square | 83 |

EXAMPLES 3-4

Two primer compositions were formulated to cover the porosity in some plastic molded products. The procedure and base resin formulation of Example 1 were employed, with the exception that the compositions were sprayed onto imperfect panels of the molding compound of Example 1. Following the procedure described therein, a smooth continuous coating was achieved. The results are set forth below.

| COMPOSITION | Parts/100 | |
|---|---|---|
| Base Resin Formulation | 28.0 | 24.8 |
| Black Pearls 130 | 25.5 | |
| Printex G Carbon (DeGussa Corp., Ridgefield Park, N.J.) | | 16.6 |
| Deionized Water | 41.6 | 54.6 |
| Isopropyl Alcohol | 2.8 | 0.6 |
| Siloxane L7605 (Union Carbide Corp., Danbury, CT) | 1.6 | 2.0 |
| Dimethyl Amino Ethanol | 0.5 | |
| R/P Ratio | 0.70 | 0.95 |
| Ohms/Square | 67 | 74 |

EXAMPLE 5

Following the procedures and using the base resin formulation of Example 1, four primer compositions of different resin to pigment ratios were made and tested using another pigment grade carbon. The compositions and results are set forth below.

| COMPOSITION | Parts/100 | Parts/100 | Parts/100 | Parts/100 |
|---|---|---|---|---|
| Base Resin Formulation | 19.4 | 17.63 | 22.44 | 26.1 |
| RAVEN 1000 Carbon Black (Columbian Chemicals, Atlanta, GA) | 20.0 | 21.13 | 18.07 | 15.7 |
| Deionized Water | 60.0 | 60.44 | 58.69 | 57.34 |
| Dimethyl Amino Ethanol | 0.8 | 0.8 | 0.8 | 0.8 |
| R/p Ratio | 0.62 | 0.53 | 0.79 | 1.06 |
| Ohms/Square | 51 | 65 | 113 | 298 |

EXAMPLE 6

A composition using the base resin formulation of Example 1 but extended with pigments to provide a gray primer is illustrated by this example. The composition and results are tabulated below:

| COMPOSITION | Parts/100 |
|---|---|
| Base Resin Formulation | 28.7 |
| VM + P Naphtha | 11.5 |
| Isopropyl Alcohol | 4.0 |
| Raven 410 Carbon Black | 14.0 |
| Titanium Dioxide | 14.0 |
| Blanc Fixe Micro (Barium Sulfate, Sachtleben Chemie, imported by the Ore Chemical Co., 520 Madison Ave., New York, N.Y.) | 14.0 |
| Toluene | 2.0 |
| Mineral Spirits | 4.0 |
| Isobutyl Alcohol | 4.0 |
| Hi Sol-10 (High boiling aromatic, hydrocarbon solvent, Ashland Chemical Co., Ashland, KY) | 1.7 |
| Siloxane L7605 | 2.0 |

(The last four ingredients were added after milling to adjust solids and viscosity.)

| R/P Ratio | 0.44 |
|---|---|
| Ohms/Square | 117 |

EXAMPLE 7

This example illustrates the preparation of another gray primer using a different base resin formulation. The compositions and results are set forth below.

| | Parts/100 |
|---|---|
| A. Base Resin | 62.5 |
| XR10-789-20 (water reducible phenolic resin, 75% solids, Freeman Chemical Corp., Port Washington, WI 53074) | |
| EKTASOLV EP | 12.5 |
| 5% Manganese Hydrocure | 1.3 |
| 50% Solution Surfonyl 104 | 3.0 |
| CYMEL 350 | 19.6 |
| Dimethyl Amino Ethanol | 1.1 |
| B. Primer | |
| Base resin formulation of Part A | 28.0 |
| Raven 410 Carbon | 13.5 |
| Titanium Dioxide | 23.0 |
| Deionized Water | 28.0 |
| Demineralized Water | 7.0 |
| Dimethyl Amino Ethanol | 0.5 |

(The last two ingredients added to adjust pH and viscosity.)

| R/P Ratio | 0.47 |
|---|---|

| | |
|---|---|
| Ohms/Square | 113 |

EXAMPLE 8

An epoxy resin, pigment extended primer is illustrated by this example.

| | Parts/100 |
|---|---|
| A. Base Resin | |
| EPITEX 183 (modified epoxy resin, Hi Tek Co., Jeffersonton, KY) | 18.0 |
| Xylene | 75.0 |
| 9% BYKANOL Surfactant (Mallincrodt Chemicals, St. Louis, MO) | 0.5 |
| Suspeno-220 (Suspending aid, Polyresin Co., Dundee, IL) | 2.5 |
| Cabo-Sil EH-5 (Cabot Corp.) | 2.0 |
| Thixatrol ST (thickener, NL Industries, Heightstown, N.J. 08520) | 1.0 |
| EHEC X HIGH (thickener, Aqualon Co., Wilmington, DE) | 1.0 |
| B. Primer Composition | |
| 1) Base resin formulation of Part A | 27.0 |
| Titanium Dioxide | 4.5 |
| Calcium Carbonate | 10.2 |
| Raven 410 Carbon | 10.5 |
| After grinding the above with the base resin, the following ingredients were added and blended | |
| 2) 7196-E-60 (modified phenolic resin, Ohio Poly Chem, Columbus, OH) | 18.0 |
| Xylene | 24.0 |
| VM + P Naphtha | 5.5 |
| 12% Cobolt Drier (Mouney Chemical, | 5.5 |
| 6% Calcium Drier (Mouney Chemical) | 0.05 |
| 18% Zirconium Drier (Mouney Chemical) | 0.05 |
| Exkin No. 2 Methyl Ethyl Ketoxime (Hüls America, Piscataway, N.J.) | 0.1 |

As previously described the viscosity is adjusted with VM+P Naphtha and xylene and sprayed onto panels and cured following the procedure of Example 1.

| | |
|---|---|
| R/P Ratio | 0.62 |
| Ohms/Square | 500 |

EXAMPLE 9

This example illustrates the preparation of a primer based on a two part urethane resin system.

A. Part 1

The following components were ground to a Hegman grind of 7 to 8:

| | Parts/100 |
|---|---|
| Au608 Acrylic Polyol (Rohm & Haas, Philadelphia, PA) | 27.0 |
| Ethyl-3-Ethoxy Propionate | 40.0 |
| KR-238-T-Titanate | 0.26 |
| DiButyl Tin Dilaurate Solution Air Products, Allentown, PA) | 0.01 |
| Raven 1000 Carbon Black | 16.0 |

The mixture was removed from the mill and ground with the following components:

| | |
|---|---|
| Tinuvin 292 (UV stabilizer, Ciba Geigy, Ardsley, NY) | 1.3 |
| Ethylethoxy Propionate | 4.0 |

The viscosity was adjusted with VM+P Naphtha and Xylene.

B. Part II

Prior to use, Part I was blended again and the following components added:

| | |
|---|---|
| N3300 Isocyanate Prepolymer (Mobay Pittsburgh, PA) | 5.3 |
| N-Butyl Acetate | 6.3 |

Following the procedure of Example 1, the mixed system was sprayed into panels and cured.

| | |
|---|---|
| R/P Ratio | 1.33 |
| Ohms/Square | 5000 |

EXAMPLE 10

This example illustrates a primer using water miscible glycol as the solvent. The procedures of Example 1 were followed.

| A. Base Resin Formulation | Parts/100 |
|---|---|
| Kelsol 3950-BZG-70 | 63.0 |
| Cymel 350 | 19.5 |
| 5% Manganese Hydrocure | 1.3 |
| KR-238-T-Titanate | 0.5 |
| 50% Solution of ND600 (Surfactant, Air Products, Allentown, PA) | 2.5 |
| AMP-95 Stabilizer (Angus Chemical Co., Northbrook, IL) | 1.1 |
| Butyl Cellosolve (ethylene glycol monobutyl ether, Ashland Chemicals, Inc., Columbus, OH) | 12.0 |

B. Primer

Five compositions of varying R/P ratios were prepared following the procedure of Example 1. Gloss was measured at a 60° angle using a Glossmeter 4030 manufactured by Mallinkrodt, West Germany.

The results are set forth below and are shown on FIG. 1.

| COMPOSITION | Parts/100 | | | | | |
|---|---|---|---|---|---|---|
| Base Resin Formulation | 16.73 | 22.29 | 26.31 | 29.41 | 31.82 | 33.83 |
| Raven 410 Carbon Black | 30.64 | 25.86 | 22.40 | 19.74 | 17.66 | 15.96 |
| Deionized Water | 52.07 | 51.23 | 50.61 | 50.15 | 49.78 | 49.47 |
| Dimethyl amino ethanol | 0.56 | 0.62 | 0.67 | 0.70 | 0.73 | 0.70 |
| R/P Ratio | 0.35 | 0.55 | 0.75 | 0.95 | 1.15 | 1.35 |
| Ohms/Square | 93.0 | 79.0 | 61.6 | 102.0 | 238.0 | 359.0 |
| Gloss | 52.0 | 40.0 | 29.0 | 28.0 | 46.0 | 76.0 |

EXAMPLE 11

Figure 2:
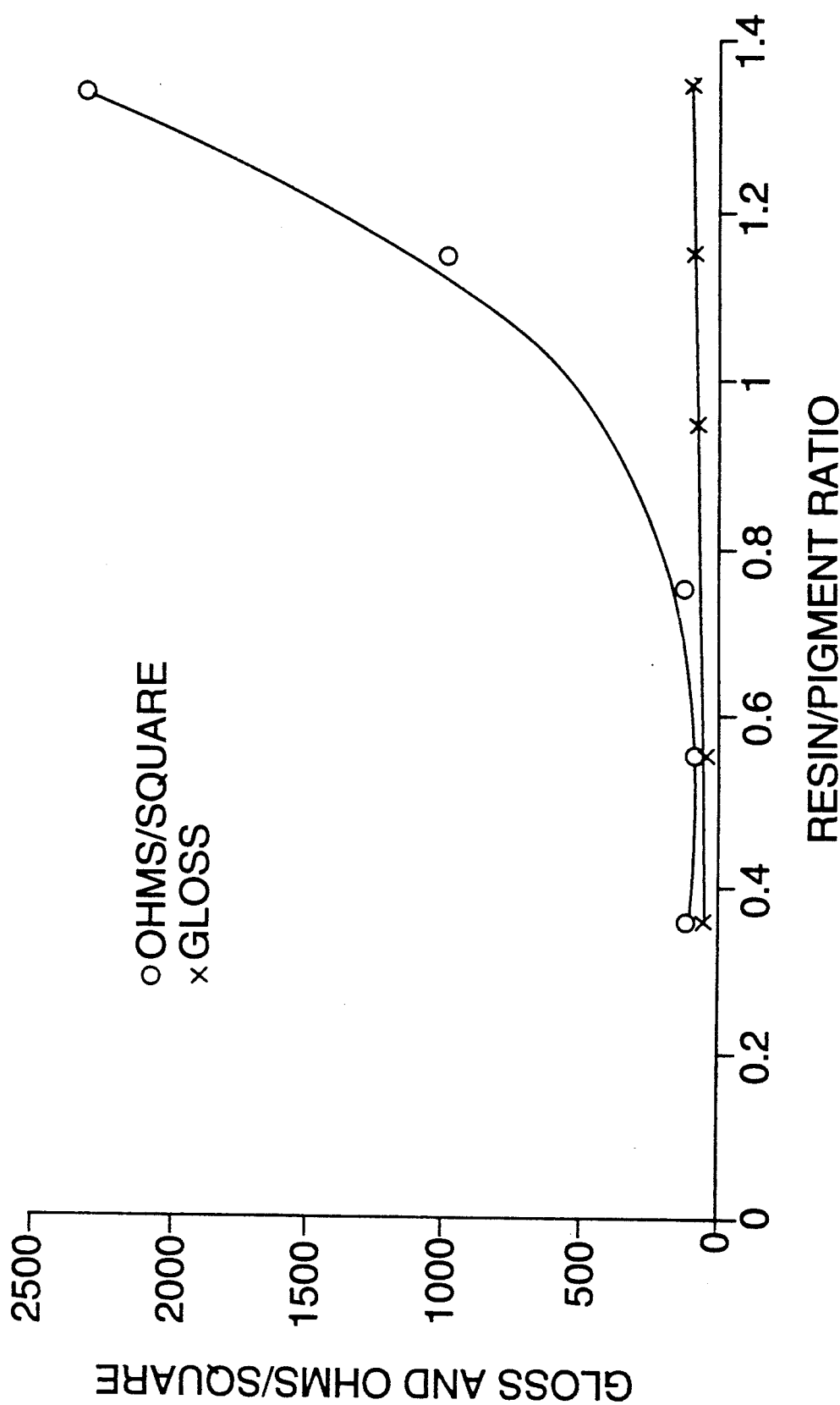

Example 10 was repeated using Butyl Carbitol (diethylene glycol monobutyl ether, Union Carbide Corp., Danbury, Conn.) instead of Butyl Cellosolve. The results are set forth below and in FIG. 2.

| R/P Ratio | Ohms/Square | Gloss |
| --- | --- | --- |
| 0.35 | 93.0 | 52.0 |
| 0.55 | 42.1 | 38.0 |
| 0.75 | 98.0 | 58.0 |
| 0.95 | 302.0 | 97.0 |
| 1.15 | 964.0 | 86.0 |
| 1.35 | 231.8 | 89.0 |

EXAMPLE 12

Example 10 was repeated using propylene glycol monomethyl ether instead of Butyl Cellosolve. The results are set forth below and in FIG. 3.

| R/P Ratio | Ohms/Square | Gloss |
| --- | --- | --- |
| 0.35 | 128.0 | 78.0 |
| 0.55 | 79.5 | 61.0 |
| 0.75 | 48.0 | 42.0 |
| 0.95 | 92.0 | 49.0 |
| 1.15 | 255.0 | 70.0 |
| 1.35 | 776.0 | 79.0 |

EXAMPLE 13

This example illustrates a primer based on a water insoluble resin made water soluble with a glycol ether. The procedures of Example 1 were employed.

| A. Base Resin Formulation | Parts/100 |
| --- | --- |
| K-Flex-188-50 (water insoluble polyester polyol, King Industries, Norwalk, CT 06852) | 20.53 |
| Cymel 350 | 10.26 |
| BYK VP-020 Defoamer (Mallincrodt Chemicals, St. Louis, MO) | 0.20 |
| EKTASOLV EP | 68.67 |
| KR-238-T-TITANATE | 0.33 |

| B. Primer | | | | | |
| --- | --- | --- | --- | --- | --- |
| Base Resin | 54.4 | 56.81 | 58.75 | 60.32 | 61.42 |
| Raven 410 Carbon Black | 23.82 | 20.99 | 18.72 | 16.90 | 15.40 |
| Deionized Water | 20.72 | 21.09 | 21.39 | 21.63 | 21.83 |
| NACURE 155 (dinonyl naphthalene disulfonic adie, King Industries) | 0.66 | 0.69 | 0.71 | 0.71 | 0.73 |
| R/P Ratio | 0.7 | 0.9 | 1.1 | 1.3 | 1.5 |
| Ohms/Square | 23.5 | 45.85 | 70.85 | 113.0 | 185.0 |
| Gloss | 22.0 | 30.0 | 50.0 | 55.0 | 63.0 |

COMPARATIVE EXAMPLE

Paste A of Example 1 of U.S. Pat. No. 3,658,737 was prepared using a pulverized anthracite coal (less than 200 mesh-mesh-Carbo-O-Fil). Four primer compositions were prepared at various resin to pigment ratios and tested following the procedures and using the base resin formulation of Example 1 of this application. The compositions and results are set forth below:

| COMPOSITION | Parts 100 | | | |
| --- | --- | --- | --- | --- |
| Base Resin Formulation | 17.53 | 24.80 | 27.09 | 30.23 |
| Paste A | 56.23 | 44.09 | 38.02 | 32.27 |
| Deionized Water | 25.64 | 30.51 | 34.29 | 36.9 |
| Dimethyl amino ethanol | 0.6 | 0.6 | 0.6 | 0.6 |
| R/P Ratio | 0.35 | 0.63 | 0.8 | 1.05 |
| Ohms/Square | no measurable conductivity* | | | |
| Gloss | 0 | 0 | 10 | 50 |

*When measured on the on the Micronta 22-193 apparatus, resistivity was above 200,000 ohms/square.

As a control, the experiment was repeated with compositions of this invention prepared at the same resin to pigment ratios. The results set forth below indicate that replacement of the anthracite coal paste with the pigment grade carbon formulation provided a conductive coating composition.

| Composition | Parts/100 | | | |
| --- | --- | --- | --- | --- |
| Base Resin Formulation of Part A | 23.45 | 30.6 | 32.7 | 34.8 |
| RAVEN-410 Carbon (Colombian Chemicals, Atlanta, GA) | 42.38 | 30.6 | 25.8 | 21.0 |
| Deionized Water | 34.17 | 38.0 | 40.8 | 43.5 |
| Dimethylaminoethanol | 0.6 | 0.6 | 0.6 | 0.6 |
| R/p Ratio (Resin/Pigment) | 0.35 | 0.63 | 0.8 | 1.05 |
| Ohms/Square | 56 | 45 | 191 | 512 |
| Gloss | 60 | 55 | 50 | 76 |

What is claimed is:

1. A conductive coating composition having a resistivity less than 200,000 ohms/square which comprises:
   a) a pigment-grade carbon;
   b) a resin; and
   c) a solvent
   wherein the pigment-grade carbon is present in a deagglomerated form.

2. The conductive coating composition of claim 1 wherein the pigment-grade carbon has ben ground to a Hegman grind between 7 and 8.0.

3. The conductive coating composition of claim 2 wherein the resin is selected from the group consisting of polyester, urethane, phenolic, melamine, epoxy, acrylic and alkyd.

4. The conductive coating composition of claim 3 wherein the solvent is an ether of an alkylene glycol.

5. An article comprising a substrate having thereon and conductive coating made from the composition of claim 4 having a resistivity between about 10 and about 5000 ohms/square.

6. An article comprising a substrate having thereon and conductive coating made from the composition of claim 2 having a resistivity between about 10 and about 5000 ohms/square.

7. An article comprising a substrate having thereon and conductive coating made from the composition of claim 3 having a resistivity between about 10 and about 5000 ohms/square.

8. The conductive coating composition of claim 1 wherein the resin to pigment ratio is from about 0.35 to about 1.5.

9. The conductive coating composition of claim 8 wherein the pigment grade carbon has been ground to a Hegman grind between 7.0 and 8.0.

10. An article comprising a substrate having thereon and conductive coating made from the composition of claim 9 having a resistivity between about 10 and about 5000 ohms/square.

11. An article comprising a substrate having thereon and conductive coating made from the composition of claim 8 having a resistivity between about 10 and about 5000 ohms/square.

12. An article comprising a substrate having thereon and conductive coating made from the composition of claim 1 having a resistivity between about 10 and about 5000 ohms/square.

* * * * *

UNITED STATES PATENT AND TRADEMARK OFFICE
CERTIFICATE OF CORRECTION

PATENT NO. : 5,282,887
DATED : Feb. 1, 1994
INVENTOR(S) : Arthur S. Gay et. al.

It is certified that error appears in the above-identified patent and that said Letters Patent is hereby corrected as shown below:

Column 1, line 20, delete "726,902";
add ---Art--- after "Related".

Column 4, line 33, correct the spelling of "grinding".

Column 10, line 41, "and" should read ---a---.

Column 10, line 45, "and" should read ---a---.

Column 10, line 49, "and" should read ---a---.

Column 10, line 59, "and" should read ---a---.

Column 10, line 63, "and" should read ---a---.

Column 10, line 67, "and" should read ---a---.

Signed and Sealed this

Fifteenth Day of August, 1995

Attest:

BRUCE LEHMAN

*Attesting Officer*     *Commissioner of Patents and Trademarks*